(No Model.) 4 Sheets—Sheet 1.

J. B. GURY.
MACHINE FOR CUTTING LENSES.

No. 554,677. Patented Feb. 18, 1896.

Witnesses
E. E. Vernell.
W. A. Alexander.

Inventor
John B. Gury
By his Attorneys
Fowler & Fowler (No Model.) 4 Sheets—Sheet 2.
J. B. GURY.
MACHINE FOR CUTTING LENSES.
No. 554,677. Patented Feb. 18, 1896.
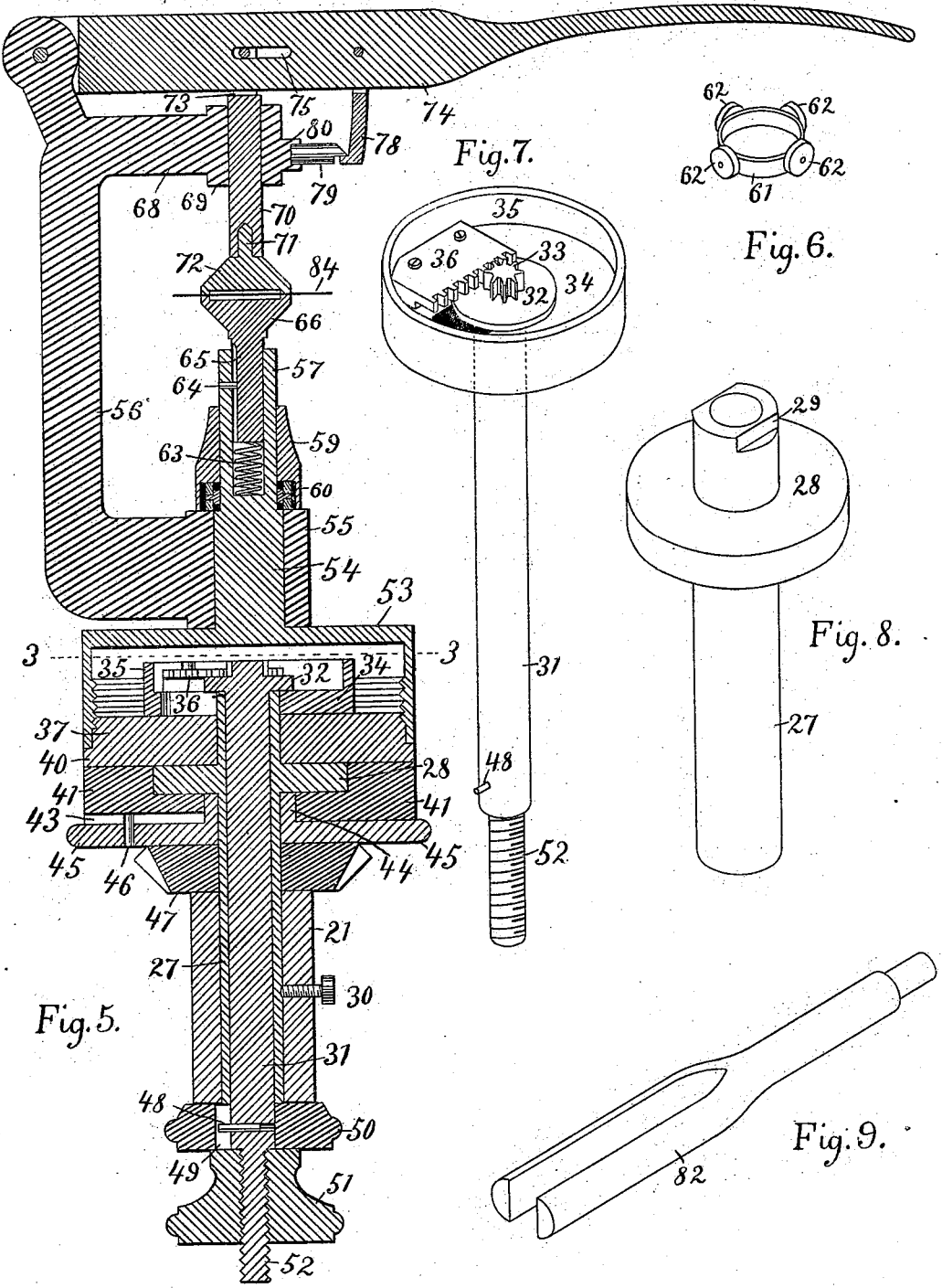
Witnesses
E. E. Vernell.
W. C. Alexander.
Inventor
John B. Gury
By his Attorneys
Fowler & Fowler

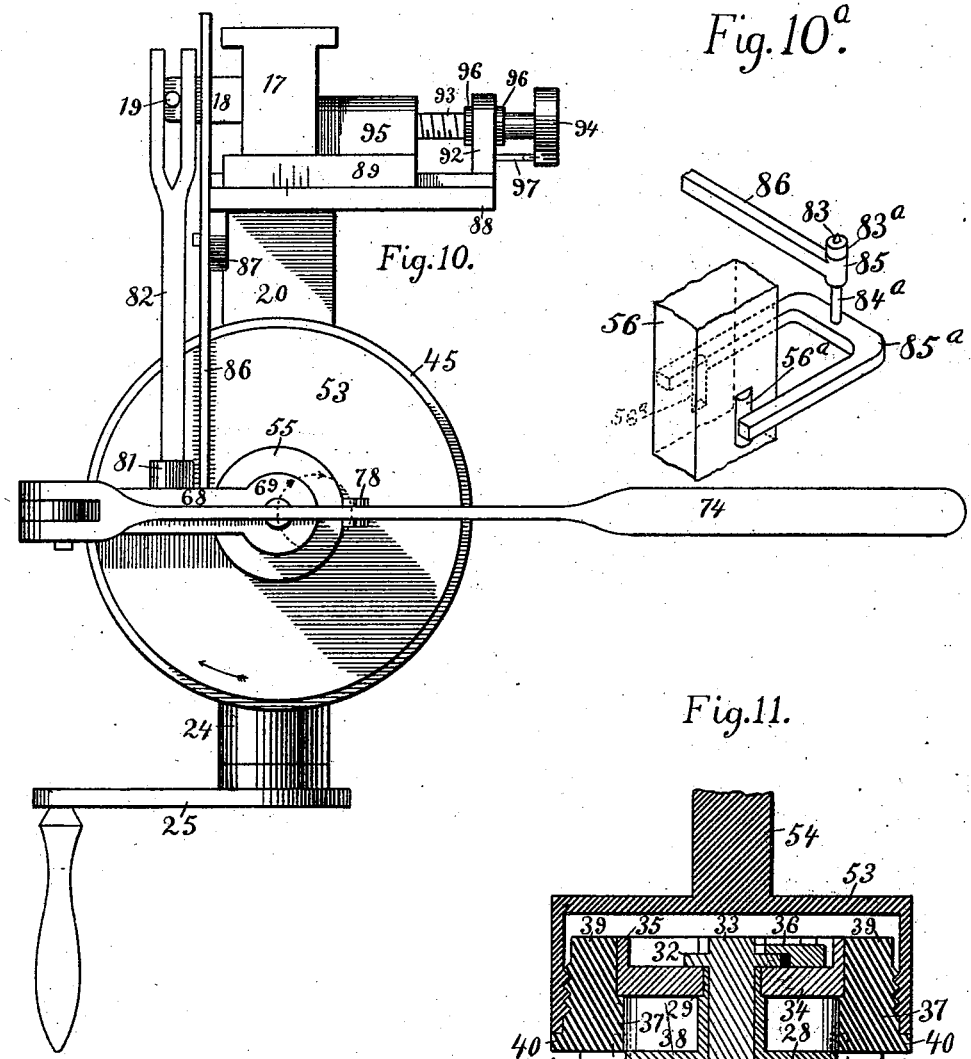

(No Model.) 4 Sheets—Sheet 4.

J. B. GURY.
MACHINE FOR CUTTING LENSES.

No. 554,677. Patented Feb. 18, 1896.

Witnesses
E. E. Vernell
W. A. Alexander

Inventor
John B. Gury
By his Attorneys
Fooler & Fowler

UNITED STATES PATENT OFFICE.

JOHN BAPTISTE GURY, OF ST. LOUIS, MISSOURI.

MACHINE FOR CUTTING LENSES.

SPECIFICATION forming part of Letters Patent No. 554,677, dated February 18, 1896.

Application filed May 14, 1895. Serial No. 549,269. (No model.)

*To all whom it may concern:*

Be it known that I, JOHN BAPTISTE GURY, a citizen of the United States, residing at the city of St. Louis, in the State of Missouri, have invented a certain new and useful Machine for Cutting Lenses, of which the following is such a full, clear, and exact description as will enable any one skilled in the art to which it appertains to make and use the same, reference being had to the accompanying drawings, forming part of this specification.

My invention relates to a new and useful machine for cutting lenses, and more particularly for cutting lenses for spectacles or eyeglasses. Heretofore these lenses have been cut by hand or by a machine which would only cut one size and shape of lens.

The object of my invention is to provide a machine which can be adjusted to cut any shape of lens, from a circle to that having the greatest desired degree of ellipticity, and which can be independently adjusted to cut any desired size of lens. The lenses can thus be cut to fit any frame with absolute accuracy and need no fitting such as is necessary with hand-cut glasses. The work is thus accomplished with a great saving of time and expense, as no skilled labor is required to operate the machine.

Figure 1:
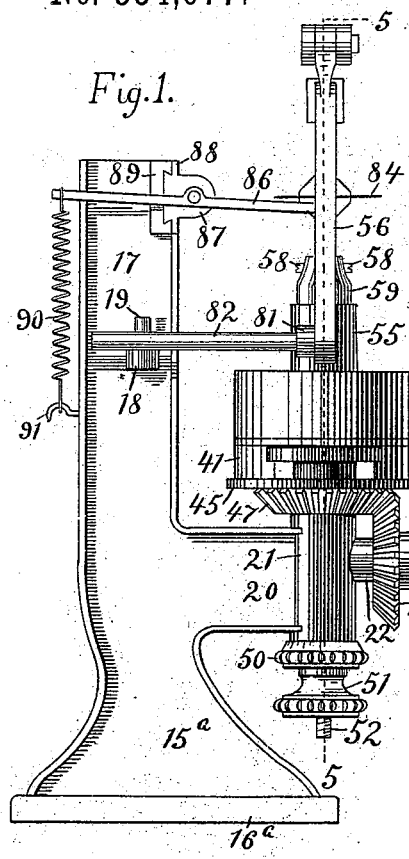
Figure 2:
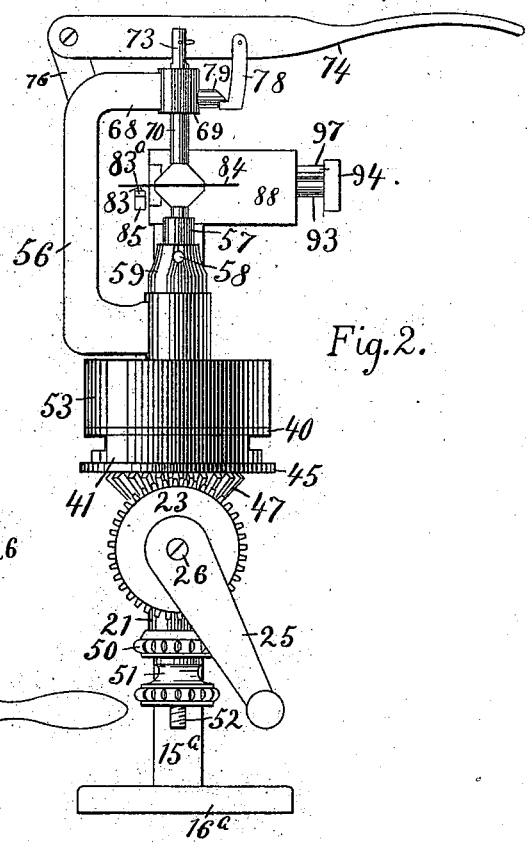
Figure 3:
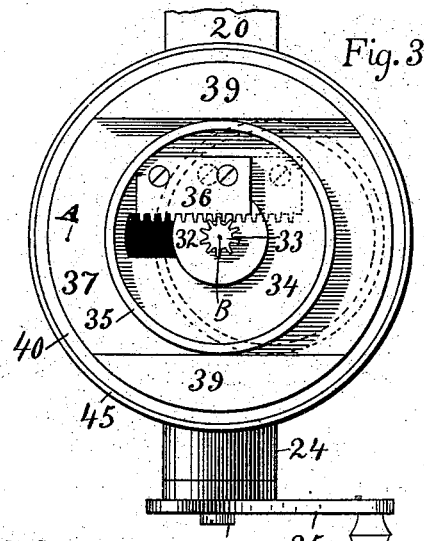
Figure 4:
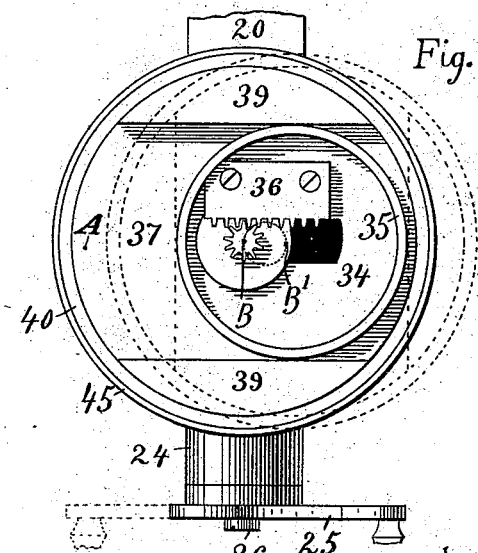
Figure 12:
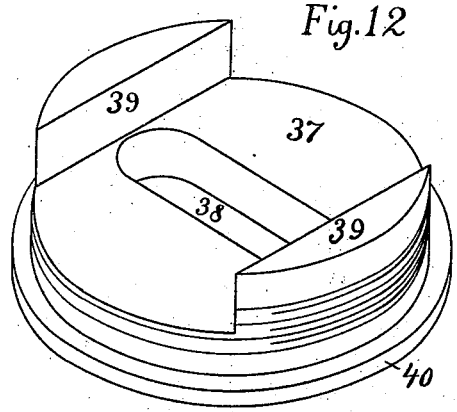
Figure 14:
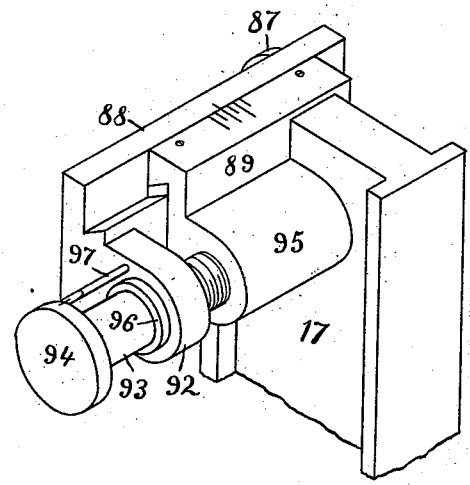
Figure 13:
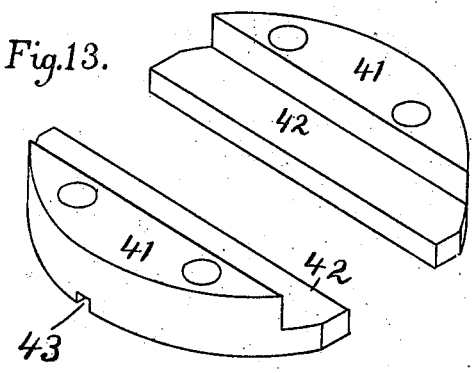
Figure 15:
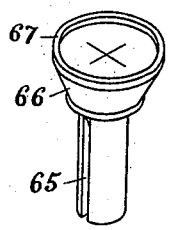
Figure 16:
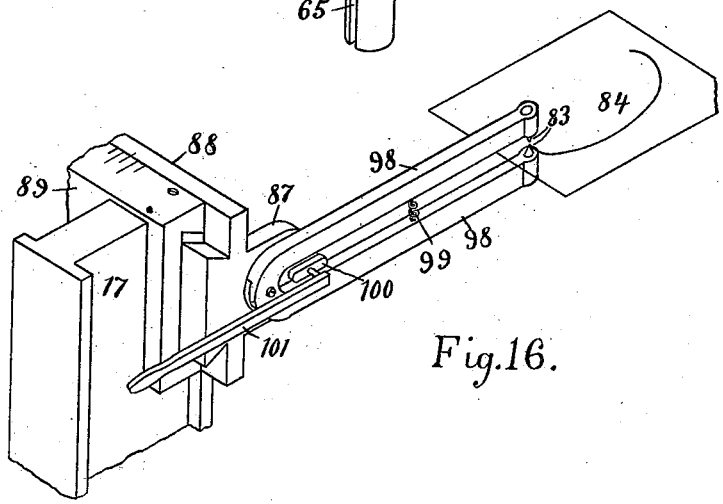

In the accompanying drawings, which illustrate a machine embodying one form of my invention, Figure 1 is a side elevation thereof on a reduced scale. Fig. 2 is a front elevation on a reduced scale. Fig. 3 is a top view on the line 3 3 of Fig. 5. Fig. 4 is a view similar to Fig. 3, the parts being in a different position. Fig. 5 is a section on the line 5 5 of Fig. 1. Fig. 6 is an isometric projection of a detail. Fig. 7 is an isometric projection of the parts regulating the eccentric or elliptical motion of the part carrying the lens. Figs. 8 and 9 are isometric projections of details. Fig. 10 is a top view. Fig. 10$^a$ is an isometric projection of a modification of the device for holding the diamond. Fig. 11 is a vertical section through part of the machine at right angles to that shown in Fig. 5. Fig. 12 is an isometric projection of a detail. Fig. 13 is an isometric projection of the parts secured to the under side of that shown in Fig. 12. Fig. 14 is an isometric projection of the mechanism for regulating the size of the lens cut with the machine. Fig. 15 is an isometric projection of a detail. Fig. 16 is an isometric projection of a modification of the device for holding the diamond.

Like marks of reference refer to similar parts in all the views of the drawings.

15$^a$ is a main frame or standard supported by a base 16$^a$. The frame 15$^a$ has an upward extension 17 bearing a projection 18 containing a pin 19. Said frame also has a lateral extension 20, Figs. 1 and 10, carrying a vertical cylindrical part 21 for supporting the main part of the machine. On the cylindrical part 21 is a horizontal cylindrical projection 22, Fig. 1. These parts are preferably cast in one, with the exception of the pin 19, which is first turned and then placed in the projection 18. A bevel gear-wheel 23, having formed on it a collar 24, suitably secured to a crank-handle 25, is revolubly secured to the projection 22 by the screw-pin 26, upon which said parts rotate.

Passing through the cylindrical projection 21 is a sleeve 27, Figs. 5 and 8, having formed on it a disk or collar 28. From opposite sides of the upper end of the sleeve 27 two segments are removed, leaving a flattened portion 29, Fig. 8. This rod is secured in the part 21 by means of a set-screw 30, Fig. 5. Through the sleeve 27 passes a rod or stem 31, Figs. 5, 7, and 11, having formed on its upper end a disk 32 and a spur pinion-wheel 33. The rod or stem 31 also passes through a slotted cam-disk 34, Figs. 5, 7, and 10, having an upwardly-extending peripheral rim 35. To this cam-disk 34 is screwed, or otherwise suitably secured, a rack 36, engaging with the pinion-wheel 33 on the rod 31. The slot in the cam-disk 34, (shown black in Fig. 7,) through which the rod 31 passes, is made large enough to receive the flattened portion 29 of the sleeve 27. This prevents the cam-disk 34 from turning independently of the sleeve 27, so that by turning the rod 31 the cam-disk 34 can be moved eccentrically to the disk 28.

37, Fig. 12, is a threaded disk or rotary member having formed in it a radial slot 38, through which passes the sleeve 27. This disk 37 has formed upon the upper side, at right angles to the slot 38, two segments 39, the distance between them being just sufficient to receive the cam-disk 34, which cam-disk prevents said segments from being seen in Fig. 5. The disk 37 also has formed on it a flange 40. To the under side of the disk 37 are screwed, or otherwise suitably secured, two segments 41, having flanges 42, forming a guideway parallel to the slot 38 for receiving the disk 28 on the sleeve 27, Figs. 5, 8, and 11. In the lower side of one of the segments 41 is formed a groove 43, Figs. 5 and 13. The adjacent edges of the flanges 42 form a guideway for a collar 44, Figs. 5 and 11, on a circular plate 45, through which the sleeve 27 passes. In this plate 45 is set a pin 46, Fig. 5, which projects into the groove 43 in the segment 41, and thus prevents the segments 41 and disk 37, to which they are attached, from rotating independently of the plate 45. To the lower side of said plate 45 is screwed, or otherwise suitably secured, a bevel gear-wheel 47, Figs. 1, 2, and 5, which engages with the bevel gear-wheel 23, Figs. 1 and 2, heretofore described, by which it is driven.

The rod or stem 31, Figs. 5 and 7, extends below the hollow rod 27 and is provided with a pin 48, which projects into the groove 49 formed in the adjustment-nut 50, Figs. 1, 2, and 5. This nut 50 provides means for turning the rod 31 and thus moving the cam-disk 34 eccentric to said rod, and is graduated around its conical surface, as shown in Fig. 1, so that the disk 34 can be moved accurately to any desired degree of eccentricity. Said nut 50 is held in the desired position by a lock-nut 51 on the threaded portion 52 of the rod 31. The sleeve 27 projects slightly below the part 21, Fig. 5, so that when the lock-nut 51 is screwed against the nut 50 the bevel gear-wheel 47 will not be drawn down against the part 21, and the rotation of the parts of the machine thus prevented.

53 is an internally-threaded cap which is screwed upon the threaded disk 37. From the top of this cap 53 extends a spindle 54, Figs. 5 and 11, passing through the hollow cylindrical portion 55 of a movable frame 56. The spindle 54 has a reduced portion 57, Figs. 2 and 5, around which is fastened, by means of two screws 58, Figs. 1 and 2, a collar 59. The lower part of this collar 59 is bored out larger than the part 57, as shown in Fig. 5, and in this space is placed an antifriction-bearing 60, Fig. 6, consisting of a loose ring 61, having four wheels 62 journaled upon it by pins extending therefrom. The purpose of this is to reduce the friction between the collar 59 and the part 55. The reduced part 57 of the spindle 54 is hollow, and has placed in it a spiral spring 63, Fig. 5. Into said part 57 projects a pin 64, which engages with a groove or key-seat 65, Figs. 5 and 15, in a part or spindle 66, which serves as one of the parts between which the lens to be cut is held. A portion of the top of this part 66 is removed, leaving an annular ledge 67, Fig. 15, to better accommodate the curved surface of the lens. Through the center of the top of this part 66 two lines are drawn at right angles to each other to aid in centering the lens. The upper lateral extension 68 of the frame 56, Figs. 2 and 5, is provided with a cylindrical portion 69, through which passes a rod or spindle 70, in the lower end of which is a depression into which projects a pin 71 on a part 72, which is similar to the upper portion of the part or spindle 66. Between these parts 72 and 66 the lens to be cut is held during the operation of cutting. The rod 70 is provided with a bifurcated portion 73, between which the hand-lever 74 comes, said hand-lever being connected to said rod by a pin passing through said bifurcated portion and a slot 75 in the lever 74. The hand-lever 74 is pivoted by means of a pin to an extension 76 on the frame 56, and is provided with a hook or dog 78, which engages with a tooth 79 set in a projection 80 on the cylindrical portion 69. The frame 56 also has a projection 81, Figs 1 and 10, to which is secured one end of the bifurcated rod 82, Figs. 1 and 10, (shown in detail in Fig. 9,) the forked end of which passes around the pin 19 on the projection 18 of the main frame 17, and thus prevents the frame 56 from rotating, but permits said frame to have such motion as will allow the end thereof through which the spindle 54 passes to have a circular translatory motion at the same time the spindle 54 is rotating on its axis. The pin 19, Figs. 1 and 10, pivots the bifurcated rod 82 and at the same time allows said rod to slide back and forth on it.

The diamond 83, Fig. 2, for cutting the lens 84 is held in a matrix 83$^a$, firmly secured in a collar 85 on a bar 86, Figs. 1 and 10, secured to a projection 87, Figs. 1, 10, and 14, on a plate 88, which is dovetailed into a thickened portion 89, Figs. 2 and 14, on the upward extension 17 of the main frame 15. From the end of the bar 86 extends a spiral spring 90, Fig. 1, which is secured to the main frame 15 by means of a hook 91. The spring 90 is of such length that the diamond will not be pressed against the lens when the hook 78 is disengaging from the notch 79 and the hand-lever 74 is allowed to rise, but will press firmly against the lens when the hand-lever is depressed and hooked in place, as shown in Figs. 2 and 5. Instead of securing the matrix 83$^a$ rigidly in the collar 85, it may be mounted as shown in Fig. 10$^a$, in which case the matrix 83$^a$ is provided with a rod 84$^a$ passing loosely through the collar 85. To the end of the rod 84$^a$ is secured a U-shaped piece 85$^a$, the arms of which pass on either side of the frame 56 and bear on two semicylindrical projections 56$^a$ secured to said frame.

When the machine is in operation the circular translatory motion of the frame 56 will impart an oscillatory motion to the arms of the U-shaped piece 85$^a$ and thus cause the diamond to be rotated for some distance. The same faces of the diamond are thus kept tangent to the curve of the ellipse—that is, the same cutting-edge of the diamond is always presented to the lens—and thereby the wear upon the point of the diamond lessened and a smoother cut made upon the lens.

Formed on the plate 88 at the opposite end from the projection 87 is a rearward projection 92, Fig. 14, through which passes a threaded bolt 93, Figs. 2, 10, and 14, provided with a circular head 94, by means of which it is rotated. Said threaded bolt 93 screws into a projection 95, Fig. 14, on the part 89 and is prevented from sliding in the part 92 by means of two collars 96, Figs. 10 and 14, placed on it at each side thereof. By turning the circular head 94 of the threaded bolt 93 the plate will be moved along the part 89 and the diamond thus adjusted at any desired distance from the parts 66 and 72 holding the lens.

To aid in setting the diamond at the required distance, the top of the part 89 is provided with a graduated scale and the top of the plate 88 with a mark or index adapted to register with the graduations of said scale. To render the adjustment more accurate and easily made, the periphery of the circular head 94 of the bolt 93 is provided with two graduations diametrically opposite, Figs. 2, 10, and 14, and the projection 92 provided with a pin 97 terminating in juxtaposition to said circular head. The pin 97 has upon it a line or index-mark adapted to register with the graduations on the head 94.

Fig. 16 illustrates a modification of the mechanism for holding the diamond. It is arranged to hold two diamonds, and is intended for cutting lenses of more than ordinary thickness. 98 are two arms in the ends of which the diamonds 83 are held. These bars are pivoted to the projection 87 and are drawn together by a coil-spring 99. Between them is placed an oval or elongated cam 100, also pivoted to the projection 87. Secured to a pin projecting from the cam 100 is a lever or handle 101. By raising or lowering this handle the cam 100 is rotated and the arms 98 caused to diverge from each other and separate the diamonds 83, so that the lens can be placed in the machine or removed from it.

The operation of the machine is as follows: The head 94 of the bolt 93 is turned until the distance of the diamond-point from the center of the part 66 (when set for a circle) is one-half the shorter axis of the ellipse desired. The adjustment-nut 50 is then turned until the disk 34 is moved out of center a distance equal to one-half of the difference between the longer and short axes of said ellipse. The hook 78 of the hand-lever 74 is then disengaged from the tooth 79 and the hand-lever is raised, carrying with it the rod or spindle 70 and part 72. The spring 63 raises the part 66 until its top is above the point of the diamond 83. The lens is then placed on the part 66, the center of the lens being placed directly above the intersection of the two lines shown in Fig. 15 on the part 66. The hand-lever 74 is pressed down until the hook 78 engages with the tooth 79, the lens being thereby firmly clamped between the parts 72 and 66 and by the same operation pressed firmly down upon the point of the diamond 83. The crank-handle 25 is then turned one revolution, which turns the lens through one revolution and causes the diamond to cut the required ellipse therein with the utmost precision. The lens is now removed by releasing the hook 78 from the pin 79. The superfluous part of the lens can then be readily broken away. The handle 25 should not be turned more than a revolution, as the point of the diamond will be injured by retracing the same line.

The principle upon which the machine operates in cutting elliptical lenses will be best understood by reference to Figs. 3, 4, and 10. These views show the parts directly involved in producing the combined rotary and revolving translatory motion which produces the ellipse. In Fig. 3 the solid lines show the parts set concentrically for cutting a circle and the broken lines show the disk 34 adjusted eccentrically to cut an ellipse.

In Fig. 4 the solid lines show the parts in the position shown by broken lines in Fig. 3, and the broken lines show the position of the parts after the handle 25 has been rotated through one-quarter of a revolution. Let A represent a point directly over which the point of the diamond stands. In the form of the invention illustrated it should be remembered that the diamond is supported independently of the movable parts and is stationary at all times during the operation of the machine. Let B represent a point directly over which the center of the lens is placed. As the lens is secured to the parts attached to the disk 37, the point B will at all times coincide with the center of said disk.

It is readily seen that when the parts are in the position shown by the solid lines in Fig. 3, and the machine is operated, the distance between A and B will be constant, as neither point changes its relative position to the other, and a circle will be traced upon the lens by the diamond. If, on the contrary, the parts be in the position shown by the solid lines in Fig. 4, the distance from A to B, on starting the machine, will be the same as in the previous instance, and will equal one-half of the shorter axis of the ellipse, but as the lens rotates about the point B the point B itself will revolve in the small circle shown by dotted lines in Fig. 4 and the point B will thus recede from the point A, thus constantly lengthening the radius of the curve traced upon the lens, until the lens has performed one-fourth of a rotation around the point B, during which time the point B has performed one-half of a revolution and is in the position B', the distance from A to B' being equal to one-half of the longer axis of the ellipse. During the next quarter-rotation of the lens around the point B said point B will approach the point A around the other half of the small dotted circle, thus constantly shortening the distance between A and B and forming the second quarter of the ellipse, at the end of which the point B will be in its original position. The second half of the ellipse is formed in the same manner as the first, the point B retracing the circular path shown by the dotted line, and thus again receding from and approaching the point A. It is seen that while the lens rotates once about its center B said center B performs two revolutions, and thus twice alternately recedes from and approaches the point A of the diamond in a circular path. The ellipse is compounded of the two circular motions referred to—namely, of the rotation of the lens as a whole and the circular translatory motion of its center.

It is not necessary to start the ellipse at the point described, but it can be started at any other point as well, the point selected being taken for convenience in describing the motion. The machine may also be used for cutting circular lenses, such as are used in telescopes, microscopes, opera-glasses, and the like. The parts shown in Figs. 3 and 4 are covered by the cap 33, and the machine is set entirely by means of the graduations on the part 89 and the adjustment-nut 50.

While in the specific form of apparatus set forth I have described the lens as revolving and the diamond stationary, it is obvious that a machine in which the diamond revolves or both the diamond and the lens revolve will embody my invention. I do not wish, therefore, to limit my invention to the details set forth, as I am aware that many changes may be made in the machine set forth and still be within the spirit of my invention.

Having fully set forth my invention, what I desire to claim and secure by Letters Patent of the United States is—

1. In a lens-cutting machine, a main frame, lens clamping and holding devices, a movable frame carrying said lens holding and clamping devices and pivotally and yieldingly connected with the main frame, driving mechanism carried by said main frame and rotating the lens clamping and holding devices and imparting motion to said movable frame.

2. In a lens-cutting machine, a main frame, lens clamping and holding devices, a movable frame carrying said lens holding and clamping devices and pivotally and yieldingly connected with the main frame, driving mechanism carried by said main frame and rotating the lens clamping and holding devices and imparting motion to said movable frame, and adjusting means determining the extent of movement of the said movable frame.

3. In a lens-cutting machine, a main frame, lens clamping and holding devices, a movable frame carrying said lens holding and clamping devices and pivotally and yieldingly connected with the main frame, driving mechanism carried by said main frame and rotating the lens clamping and holding devices and imparting motion to said movable frame, adjusting means determining the extent of movement of said movable frame, and a diamond-holder adjustable to and from the axes of the lens holding and clamping devices, whereby the size and ellipticity of the lenses are determined.

4. In a lens-cutting machine, lens-holding devices, a diamond, the lens and diamond normally being out of contact, and lens-clamping devices which when operated force the lens and diamond in contact.

5. In a lens-cutting machine, lens-holding devices, a diamond normally out of contact with the lens, clamping appliances forcing the lens-holding devices against the lens and moving them longitudinally, whereby the lens will be moved in contact with the diamond.

6. In a lens-cutting machine, lens holding and clamping devices, a diamond below the lens, a handle operating the upper lens holding and clamping device, and a spring normally maintaining the upper lens-holding devices in a raised position.

7. In a lens-cutting machine, a frame, a sleeve carried thereby, a stem within said sleeve, a cam-disk adapted to be adjusted in and out of center by said stem, lens holding and clamping devices actuated by said cam-disk, and driving mechanism rotating said lens holding and clamping devices, whereby an elliptical motion will be imparted to the lens.

8. In a lens-cutting machine, a frame, a sleeve carried thereby, a stem within said sleeve, a cam-disk adapted to be adjusted in and out of center by said stem, lens holding and clamping devices actuated by said cam-disk, driving mechanism rotating said lens holding and clamping devices, and a movable frame having a yielding pivoted connection with the main frame, which movable frame permits the lens holding and clamping devices to have a circular translatory motion.

9. In a lens-cutting machine, a frame, a sleeve carried thereby, a stem within said sleeve, a cam-disk adapted to be adjusted in and out of center by said stem, lens holding and clamping devices, rotary members carrying said lens holding and clamping devices and actuated by said cam-disk, said rotary members being radially slotted at right angles to each other, a movable frame having a yielding pivoted connection with the main frame and also carried by said rotary members, and driving mechanism rotating said rotary members.

10. In a lens-cutting machine, lens holding and clamping devices, a diamond and diamond-holder, a spindle rotating said lens-holding devices, rotary members carrying said spindle and capable themselves of circular translatory motion in addition to said rotary motion, and driving means operating said rotary members.

11. In a lens-cutting machine, lens holding and clamping devices, a diamond and diamond-holder, a spindle rotating the lens-holding devices, rotary members carrying said spindle and capable themselves of circular translatory motion in addition to said rotary motion, a cam-disk determining the extent of the circular translatory motion of said rotary members, and driving means operating said rotary members.

12. In a lens-cutting machine, lens holding and clamping devices, a diamond and diamond-holder, a spindle rotating the lens-holding devices, rotary members carrying said spindle and capable themselves of circular translatory motion in addition to said rotary motion, a cam-disk determining the extent of the circular translatory motion of said rotary members, a stem adjusting said cam-disk, a graduated nut on said stem, a lock-nut holding said graduated nut and stem in the position placed, and driving means operating said rotary members.

13. In a lens-cutting machine, lens holding and clamping devices, a diamond and diamond-holder, a spindle rotating said lens holding and clamping devices, rotary members carrying said spindle and capable themselves of circular translatory motion in addition to said rotary motion, a slotted cam-disk determining the extent of said circular translatory motion, a rack secured to said cam-disk, a pinion meshing with said rack, and a stem carrying said pinion and operating the cam-disk.

14. In a lens-cutting machine, lens holding and clamping devices, a diamond-holder, a support in which said diamond-holder is movably mounted, and automatically-operated means for turning said diamond-holder so that the same cutting-edge of the diamond is presented to the lens.

15. In a lens-cutting machine, a main frame, lens clamping and holding devices, driving mechanism rotating said lens clamping and holding devices, a movable frame carrying said lens clamping and holding devices and pivotally and yieldingly connected with the main frame, a diamond-holder, a support in which the diamond-holder is movably mounted, and a substantially U-shaped part secured to said diamond-holder, the arms of said U-shaped part extending at either side of the movable frame whereby the motion of said movable frame causes the diamond and holder to turn and thus present the same cutting-edge to the lens.

In testimony whereof I have hereunto set my hand and affixed my seal in the presence of the two subscribing witnesses.

JOHN BAPTISTE GURY. [L. S.]

Witnesses:
A. C. FOWLER,
J. F. WESTON.